A. W. H. LENDERS.
APPARATUS FOR FREEING LUMP STARCH FROM ADHERING DUST OR POWDER.
APPLICATION FILED JUNE 6, 1914.
1,223,406.
Patented Apr. 24, 1917.
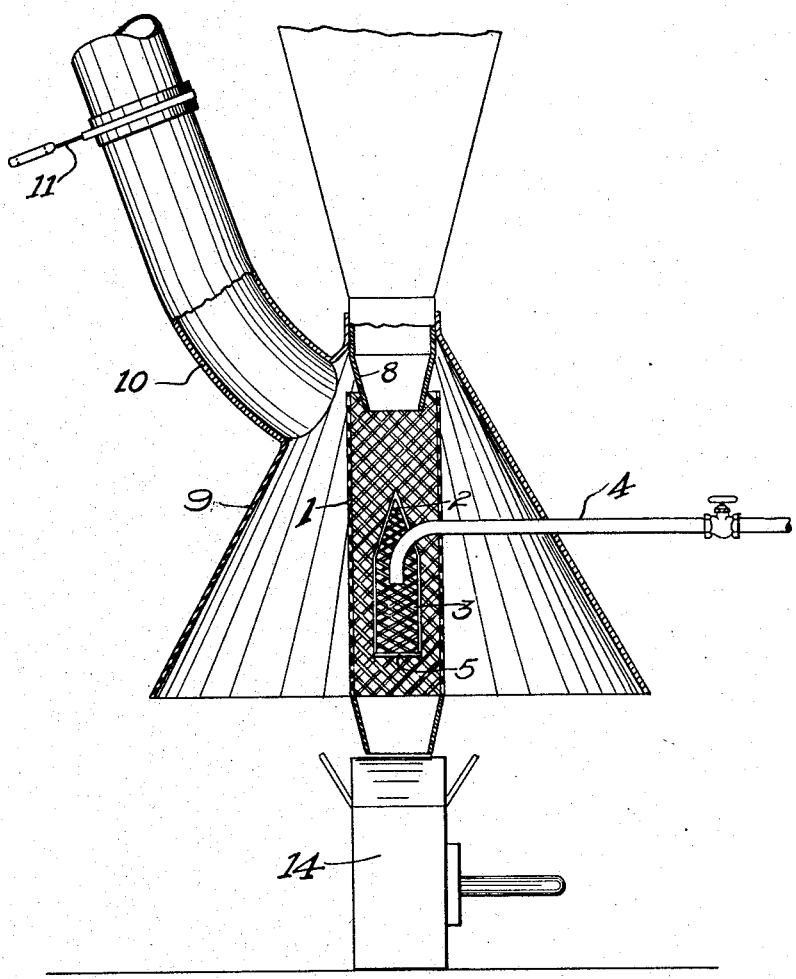

UNITED STATES PATENT OFFICE.

ADOLPH W. H. LENDERS, OF CEDAR RAPIDS, IOWA.

APPARATUS FOR FREEING LUMP-STARCH FROM ADHERING DUST OR POWDER.

1,223,406.  Specification of Letters Patent.  Patented Apr. 24, 1917.

Original application filed March 30, 1914, Serial No. 828,415. Divided and this application filed June 6, 1914. Serial No. 843,352.

*To all whom it may concern:*

Be it known that I, ADOLPH W. H. LENDERS, a citizen of the United States, residing at Cedar Rapids, in the county of Linn and State of Iowa, have invented a new form of Apparatus for Freeing Lump-Starch from Adhering Dust or Powder, of which the following is a specification.

An examination of the carton containing the lump starch, such as is now on the market, discloses the fact that the carton contains a certain percentage of dust and that the surfaces are coated with an adhering starch powder. My invention has for its object to provide apparatus which when used in connection with the packing of the starch will produce a dustless lump starch. To accomplish this result it is essential that there should be nothing to interfere with the travel of the starch after it is subjected to the means for removing the adhering starch or dust powder. I am aware that there are a number of varieties of apparatus for cleaning granular products, but none of these, with which I am familiar, could be utilized to accomplish the result produced by my invention; that is, the cleaning or removing of the adhering dust from the starch, because starch, by reason of its delicate nature and composition, is so easily abraded that it has to be handled with the greatest care, which is provided for in my improved apparatus as will be hereinafter described and claimed.

My means of accomplishing the foregoing objects may be more readily understood by having reference to the accompanying drawings, which are hereunto annexed and are a part of this specification, in which:

The figure is an enlarged detail view of the apparatus partly in section for handling the fine lumps.

Similar reference numerals refer to similar parts throughout the entire description.

This form of apparatus is intended to be used in conjunction with the apparatus described in my co-pending application, Serial No. 828,415, filed March 30, 1914, of which this is a division, and is designed to be used for freeing the finer particles of starch from the dust, these finer particles being the ones employed to fill the carton so that it will be of the desired weight.

As shown in the drawing, my apparatus comprises a cylinder 1, the wall of which is formed of screen or other foraminated metal, which has mounted in its center an internal structure provided with a conical top 2, having vertical cylindrical walls 3, depending downwardly from the lower edge of the conical top 2. A pipe 4, which is connected to a suitable source of compressed air supply (not shown) enters the conoidal shaped structure 2, at its top, and is adapted to discharge the air in the interior of the said structure. The air issuing from the pipe in a stream, strikes the bottom 5, of the cylindrical walls 3. This bottom is solid and diverts the direction of the air current so that it passes out radially through the foraminations in the walls 3 of the structure. The starch is discharged into a hopper 8, and passes into the annular space surrounding the conoidal structure 2, its course of travel into this space being directed by means of the shape of the top of said structure, and it necessarily passes through the radiating air currents which are passing outwardly from the cylindrical walls 3. This structure is surrounded by an inverted conoidal structure 9, the bottom of which terminates at the termination of the foraminations in the walls of the cylindrical structure 1.

A pipe 10, which is connected to a suitable exhaust fan (not shown) to produce a suction, opens into the conoidal structure 9, and is provided with a damper 11 of the usual form. The walls of the cylinder 1, are large enough to permit the escape of the dust, but are small enough to prevent the small lump or pearl starch being carried out by the radially moving current of air. It has been found in practice that to attempt to permit this dust to settle fails to accomplish the desired result and that it is necessary to provide for its escape in a totally different direction from that in which the cleaned lump starch is moving, or it will not remain free from dust. This is accomplished by means of opening the damper 11, in the pipe 10, and permitting the exhaust fan (not shown) to draw the dust laden air off, whence it may be conveyed to any suitable separating chamber.

Just below the discharge orifice of the cylindrical walls 3, is the carton 14, which is to be filled, a fragmentary portion of a weighing machine being shown. The result of this operation is that the starch delivered to the carton 14, is entirely free from dust of any kind.

Having described my invention what I regard as new and desire to secure by Letters Patent is:

1. In a device of the character described a structure provided with a vertical relatively short and narrow and substantially unobstructed passage, the walls of said structure being foraminated, said passage being open for the unobstructed discharge of material, means for passing unidirectional uninterrupted currents of air across said passage and through the foraminated walls, means for delivering starch lumps to be cleaned to the top of said passage, and suction means open to the atmosphere surrounding said device and adapted to carry away the dust passing through the foraminated wall.

2. In a device of the character described a structure provided with a vertical relatively short and narrow and substantially unobstructed passage, the walls of said structure being foraminated, said passage being open for the unobstructed discharge of material, means for passing unidirectional uninterrupted currents of air across said passage, said means being centrally located within said foraminated walls, there being an annular space intermediate the two, and means to deflect starch lumps into said space, means for passing unidirectional uninterrupted currents of air across said space and through the foraminated walls, means for delivering starch lumps to be cleaned to the top of said passage, and suction means open to the atmosphere surrounding said device and adapted to carry away the dust passing through the foraminated wall.

3. In a device of the character described, a structure provided with a vertical relatively short and narrow and substantially unobstructed passage, the walls of said structure being foraminated, said passage being open for the unobstructed discharge of material, means for passing unidirectional uninterrupted currents of air across said passage and through its foraminated walls, means for delivering starch lumps to be cleaned to the said passage, and suction means for carrying away dust issuing from said structure.

In testimony whereof, I have signed the foregoing specification.

ADOLPH W. H. LENDERS.

Witnesses:
A. M. DOUGLAS,
R. W. BLACK.

Copies of this patent may be obtained for five cents each, by addressing the "Commissioner of Patents, Washington, D. C."